US011232636B2

(12) United States Patent
Skidmore

(10) Patent No.: US 11,232,636 B2
(45) Date of Patent: Jan. 25, 2022

(54) METHODS, DEVICES, AND SYSTEMS FOR PRODUCING AUGMENTED REALITY

(71) Applicant: EDX Technologies, Inc., Austin, TX (US)

(72) Inventor: Roger Ray Skidmore, Austin, TX (US)

(73) Assignee: EDX TECHNOLOGIES, INC., Austin, TX (US)

(*) Notice: Subject to any disclaimer, the term of this patent is extended or adjusted under 35 U.S.C. 154(b) by 0 days.

(21) Appl. No.: 16/271,052

(22) Filed: Feb. 8, 2019

(65) Prior Publication Data

US 2019/0244431 A1 Aug. 8, 2019

Related U.S. Application Data

(60) Provisional application No. 62/627,965, filed on Feb. 8, 2018.

(51) Int. Cl.
*G06T 19/00* (2011.01)
*G06T 17/00* (2006.01)
(Continued)

(52) U.S. Cl.
CPC .......... *G06T 19/006* (2013.01); *G06K 7/1417* (2013.01); *G06K 19/06037* (2013.01); *G06T 15/20* (2013.01); *G06T 17/00* (2013.01)

(58) Field of Classification Search
CPC ....... G06T 19/006; G06T 15/20; G06T 17/00; G06T 2215/16; G06K 7/1417; G06K 19/06037; G06K 9/00671; G06K 9/00664–00704; A61B 2019/5291; A61B 2090/365; A63F 2300/8082; G05D 1/0038; G05D 1/0044; G05B 2219/32246; G05B 2219/36432; G05B 2219/40131; G05B 2219/32014; G05B 2219/39449; G05B 2219/39451; G06F 3/011–015; H04M 2203/359; H04N 2201/3245; H04L 29/06034; H04L 67/38
See application file for complete search history.

(56) References Cited

U.S. PATENT DOCUMENTS 9,734,634 B1 * 8/2017 Mott ..................... G06F 3/0304
9,836,888 B2 * 12/2017 Skidmore ............... G06F 3/011
(Continued)

*Primary Examiner* — Abderrahim Merouan
(74) *Attorney, Agent, or Firm* — W&C IP

(57) ABSTRACT

AR engines modify a picture or video of the real world to include more than simply real world content. The modified image/frame content is passed along to one or multiple downstream AR engines which treat the content as original input. Modifications to images/frames may include the addition of virtual markers. Virtual markers may be visual content of virtual origin that is added to an image or frame. A virtual marker may trigger a predetermined reaction from a downstream AR engine when that downstream AR engine processes the modified content. For example, a virtual marker added to an image by an upstream AR engine may trigger a downstream AR engine to output a particular augmentation. The virtual marker may have a known meaning to both the upstream AR engine and the downstream AR engine. Accordingly, there may be "collaboration" among AR engines and a reduction in the processing requirements of downstream and overall image processing.

20 Claims, 9 Drawing Sheets

(51) Int. Cl.
    *G06K 7/14*         (2006.01)
    *G06K 19/06*       (2006.01)
    *G06T 15/20*       (2011.01)

(56) References Cited

U.S. PATENT DOCUMENTS

| | | | |
|---|---|---|---|
| 9,959,674 B2* | 5/2018 | Chen | G01C 21/206 |
| 10,255,726 B2* | 4/2019 | Skidmore | G06F 3/04842 |
| 2011/0090343 A1* | 4/2011 | Alt | G06T 19/006 |
| | | | 348/164 |
| 2012/0122570 A1* | 5/2012 | Baronoff | A63F 13/655 |
| | | | 463/31 |
| 2012/0182313 A1* | 7/2012 | Ahn | G06T 19/00 |
| | | | 345/633 |
| 2013/0201217 A1* | 8/2013 | Morinaga | G06K 9/3216 |
| | | | 345/633 |
| 2014/0080605 A1* | 3/2014 | Peddi | A63F 13/00 |
| | | | 463/32 |
| 2014/0240350 A1* | 8/2014 | Chen | G06F 3/011 |
| | | | 345/633 |
| 2015/0022551 A1* | 1/2015 | Kim | G06T 19/006 |
| | | | 345/633 |
| 2015/0062163 A1* | 3/2015 | Lee | G09G 3/003 |
| | | | 345/633 |
| 2015/0228122 A1* | 8/2015 | Sadasue | G06F 3/002 |
| | | | 345/633 |
| 2016/0260256 A1* | 9/2016 | Shefi | G06T 19/20 |
| 2017/0243400 A1* | 8/2017 | Skidmore | G06F 3/04842 |
| 2018/0300551 A1* | 10/2018 | Luccin | G06K 9/2063 |
| 2018/0300952 A1* | 10/2018 | Evans | G06F 3/04845 |
| 2018/0325604 A1* | 11/2018 | Atarot | A61B 5/7475 |
| 2019/0333320 A1* | 10/2019 | Froy | H04N 21/4316 |

* cited by examiner

METHODS, DEVICES, AND SYSTEMS FOR PRODUCING AUGMENTED REALITY

CROSS-REFERENCE TO RELATED APPLICATIONS

This application claims the benefit of U.S. provisional patent application No. 62/627,965 filed Feb. 8, 2018, the complete contents of which are herein incorporated by reference.

FIELD OF THE INVENTION

The invention generally relates to augmented reality and, more particularly, some embodiments relate to the role of augmentations in producing augmented reality.

BACKGROUND

Effective AR is predicated on having some understanding of a user's surroundings in order for the virtual content that is provided as augmentations to maintain semantic context for the user. The requirement for semantic context results in a need for AR engines to have some means for "understanding" a real world environment. For instance, consider an AR engine embodied in a mobile device like a smartphone. As an initial state, the phone's AR engine has no "awareness" or understanding of the user's surroundings and therefore no basis on which to decide what is appropriate virtual content to present as augmentations to those surroundings. As a basic example, if the user is out at sea on a cruise boat, it may be nonsensical to augment the user's view of the ocean with a giraffe because the giraffe is not a sea animal. Similarly, if the user is on a street in New York looking for restaurant reviews, it may be nonsensical to display star ratings above the NYC restaurants when those star ratings are associated with restaurants located in San Francisco. The giraffe in the ocean or the San Francisco ratings above NYC restaurants would be augmentations that are out of semantic context with the user's surroundings. U.S. Pat. No. 8,451,266, titled "Interactive Three-Dimensional Augmented Realities from Item Markers for On-Demand Visualization," describes a method and system of on-demand product visualization. The method and system use image processing to identify and use physically visible markers which exist in a user's environment, such as in a paper catalog. A user first captures an image of the marker such as a QR code using a mobile device. The QR code is used to look-up data that describes the appearance of a product, for example a coffee maker. The retrieved data is used to give an augmented reality output to the user showing the product as an augmentation to the user's real world surroundings. Using the same example, the virtual coffee maker is displayed on the user's real kitchen counter. U.S. Pat. No. 8,451,266 is an example implementation by which real world markers are used to trigger the portrayal of particular virtual objects in an augmented reality output.

A number of problems and disadvantages exist with image processing of real world images in order to provide augmented reality. High among these problems are relatively high processing demands. Image processing algorithms may require relatively sophisticated or expensive computing hardware and software, consume large amounts of energy (which may be limited, especially if drawn from a battery source), and take significant amounts of time (leading to frustrating delays between a user activating an AR system and the system actually providing the desired AR content). Another problem is unreliable or poor image quality owing to such factors as camera quality or visibility. A factor like visibility is in turn affected by other factors like weather, lighting, and the like. In other words, AR systems reliant upon image processing face all the challenges of photography on top of the challenges of processing (e.g., performing object or feature recognition).

Another issue in the area of augmented reality is redundancy of efforts of independent AR engines (i.e., systems, devices, or components thereof configured for providing AR) which process similar, substantially the same, or identical real world camera feeds. In some scenarios, augmented reality output from a first AR engine is used as the input for a second AR engine. The output of the second AR engine has further augmentations such that each augmentation presented to a user may be from either the first engine or the second engine. In such configurations, however, it is common for each engine to perform image processing of their respective inputs, leading to redundancy in processing the underlying real world video feed data.

A need exists for multiple different AR engines to coordinate in the provision of AR content. If, for example, two independent AR engines are each involved in providing augmented realities for users standing at the base of the Statute of Liberty on Liberty Island looking toward Manhattan, a variety of advantages may be realized if the two AR engines are able to collaborate.

SUMMARY

According to an aspect of some embodiments, AR engines modify a picture or video of the real world to include more than simply real world content. The modified image/frame content is passed along to one or multiple downstream AR engines which may treat the content as original input. Modifications to images/frames may include the addition of virtual markers.

An exemplary virtual marker is virtual content added to an image(s) and/or frame(s) (e.g., video frame), the content having special significance to one or more other AR engines (e.g., special handling characteristics over real world content). In general, a virtual marker supplied by an upstream AR engine has a predetermined effect when it reaches a downstream AR engine. The downstream AR engine may be configured to recognize one or more applied virtual markers and augment real world content of the image or video with one or more augmentations triggered by one or more applied virtual markers. The downstream AR engine may be configured to differentiate the applied virtual marker(s) from real world content of the same image or video.

Markers may be visual content of virtual origin that is added to one or more images or frames. Accordingly, a "marker" as used hereinafter may also be referred to as a "virtual marker" to distinguish it from a "real marker" (i.e., cues in images which exist due to the existence of real world physical things off of which real light reflected and was captured by a real camera). Herein "virtual marker" will generally be used, or else "marker" for brevity of language where the context allows. Where "marker" is used for brevity, "virtual marker" is generally substitutable (whereas "real marker" is not). Terms generally substitutable herein for the term "marker" without a change in intended meaning include "trigger", "token", "catalyst", and "elicitor".

A virtual marker is "applied" or in a "state-of-use" after it is incorporated into image or video data (e.g., it may involve an alteration to pixel information that was initially describing a real world view). Before it is applied or in use, a virtual marker may be a type of metadata content that is incorporated (e.g., embedded into) a virtual world like a 3D virtual model. The virtual marker may be created and stored in the form of a virtual object in a virtual model until it is "applied" to real world content. Once applied, the virtual marker may be represented as an augmentation that may be presented (e.g., displayed or transmitted) concurrently with real world content. The method of storage and retrieval of virtual markers used with some embodiments may be consistent with existing AR content storage and retrieval methods by the same inventor (see, e.g., application. Ser. No. 15/436,154, now issued as U.S. Pat. No. 9,836,888, the complete contents of which are herein incorporated by reference). Once applied/in a state-of-use, a marker is no longer characterized as metadata but is still characterizable as "virtual" owing to its virtual origin.

Virtual markers in a state-of-use (i.e., applied) are "visible" in the sense that they are visual content presented alongside real world content. However, virtual markers may blend in with real world content that surrounds the virtual markers in an image or video such that a human eye, especially an untrained human eye, does not readily recognize the presence and/or significance of the virtual markers. A human viewer may not perceive any significant difference between real world content and virtual markers, but a downstream AR engine may be configured for recognition of the difference. As an illustrative example, a virtual marker may be a faint outline or silhouette. As another illustrative example, a virtual marker may be a shadow which does not appear in the real world. As another illustrative example, a virtual marker may be a watermark. As another illustrative example, a virtual marker may be a code comprising or consisting of special symbols or characters. As another illustrative example, a virtual marker may be some combination of some or all of the preceding examples. Further alternatives may also be used in various embodiments.

A virtual marker may trigger a predetermined reaction from a downstream AR engine when that downstream AR engine processes the modified content. For example, a virtual marker added to an image by an upstream AR engine may trigger a downstream AR engine to output a particular augmentation. A virtual marker may have a known meaning to both the upstream AR engine and the downstream AR engine. Accordingly, there may be a degree of "collaboration" among AR engines, where the processing performed by an upstream AR engine may facilitate or reduce the processing required of a downstream AR engine.

An upstream AR engine may have no awareness of what a virtual marker will elicit from a downstream AR engine. Exemplary embodiments do not require the downstream AR engine to be in communication with the upstream AR engine, although communication may be permitted. In some cases the only information "exchanged" may be one way and consist of the marked-up real world content (images or video) being passed along from the upstream AR engine to the downstream AR engine (in some cases with one or more intermediaries or waypoints between).

According to a further aspect of some embodiments, one or more virtual markers are added to real world content. The real world content and virtual marker(s) together are passed along a series of AR engines. The virtual markers are content that was not originally part of the real world content. For instance, real world content may be the visual appearance of a street block as recorded by a camera in a still image or in a video. A virtual marker, on the other hand, may be a symbol, code, or shape like a QR code that is "affixed" to a real world object (e.g., a building) in the image or frame.

Thus the virtual marker may be an virtual augmentation (abbreviated as "augmentation" herein) to the real world content. In the real world, such a QR code does not actually exist on the building in question. The QR code (or other marker, according to the particulars of an embodiment) is pre-configured for recognition by one or more other AR engines. A downstream AR engine may take as input the real world content modified with the QR code marker, and, upon detection of the QR code, perform a predetermined response. The predetermined response may add another virtual marker to the image/frame. The predetermined response may add an augmentation. The predetermined response may add an augmentation and remove the pre-existing virtual marker.

As another illustrative example building on the preceding paragraph, assume a camera-equipped device captures a video showing storefronts of an empty stripmall. The original video containing only real world content is processed by a first AR engine. This first engine modifies the video by adding a virtual marker above each store front. The modified video is subsequently processed by a second AR engine. The second AR engine detects the virtual markers and, as a predetermined response, adds signs above each store front as virtual augmentations. The end result may be an augmented reality for a property developer which shows her how the stripmall may appear once all the storefronts are occupied by business tenants. The virtual markers supplied by the first AR engine may trigger different responses from different subsequent/downstream AR engines. For instance, the output of the first AR engine may go to a third AR engine, where the markers trigger the third AR engine to supply augmentations which are facades of different colors for each storefront. A human user in this case gets an augmented reality experience by which they can evaluate the stripmall aesthetics if the facades were renovated, thereby improving its appeal to prospective tenants.

The same real world content and/or virtual markers may carry over to any number of different AR engines. Continuing the stripmall example from above, the output of the first AR engine may be processed by both the second and third AR engines, with the result that the virtual markers added by the first AR engine trigger the virtual sign augmentations in addition to the virtual color augmentations. The final augmented reality output would then be a view of this real world stripmall augmented both with colors and with store signs.

A series of AR engines comprises at least two AR engines and may comprise three, four, five, or more AR engines, some of which or all of which may process content of identical origin (e.g., content captured by a particular camera or cameras and then passed along from one AR engine to the next AR engine and so on). Indeed, exemplary embodiments are scalable with respect to the number of AR engines involved. Tens or hundreds of AR engines may play a role in providing a particular augmented reality (AR) output.

An exemplary AR engine receives content as input and outputs that content with one or more modifications. Generally the content is an image or images, or else frames (that is, a video or its constituent parts). An exemplary modification by an AR engine is the addition of one or more virtual markers. Also or alternatively, an exemplary modification by an AR engine is the addition one or more augmentations in response to a detection of an already existing virtual marker. An exemplary virtual marker is content added to an image(s) and/or frame(s) which has special significance to one or more other AR engines. In general, a virtual marker supplied by an upstream AR engine has a predetermined effect when it reaches a downstream AR engine.

In this disclosure, the adjectives "upstream", "middlestream", and "downstream" may be used to describe the relationships of AR engines with respect to one another. More specifically, the adjectives imply a direction of data flow among AR engines. If the output of an Engine A becomes input to an Engine B, Engine A may be described as an "upstream AR engine" while Engine B may be described as a "downstream AR engine". If the output of Engine B becomes input to an Engine C, then Engine B may also be described as an "upstream AR engine", at least with respect to Engine C. Thus, in some cases a single AR engine may be simultaneously "upstream" and "downstream", in which case it may be characterized as "middlestream". The most appropriate adjective or description depends on which other AR engine(s) constitutes the standard for comparison. Data flow among AR engines is typically described as moving in one direction (e.g., data flow of Engine A→Engine B→Engine C), much in the way water in a stream or river moves in only one direction. However, the use of the terms "upstream", "middlestream", and "downstream" do not necessarily preclude data flow in some other pattern or direction. For instance, using the A/B/C example, the output of Engine C may be an input to Engine A, with the result that Engine A is upstream on the one hand and downstream on the other. A variety of data flow configurations are possible among different embodiments.

After real world content is modified with a virtual marker, the virtual marker has one or more effects on one or more downstream AR engines. A frequently discussed scenario in this disclosure is the trigger of augmented reality content (AR content). A downstream AR engine, upon detecting a virtual marker originating from some upstream AR engine, outputs a predetermined augmentation based on the detected virtual marker. As an alternative, a virtual marker from an upstream AR engine may trigger a downstream AR engine to add yet a further virtual marker. The further virtual marker may trigger yet another virtual marker from yet another AR engine, and this process may repeat itself until one or more of the virtual markers added by the AR engines ultimately triggers AR content that is output (e.g., displayed) to a human user. A downstream AR engine need not know the origins of a virtual marker it detects. Thus, a downstream AR engine may recognize a virtual marker without recognizing or attempting to identify the AR engine responsible for the existence of the virtual marker.

A virtual marker may itself be AR content, and in many cases this is indeed the case. However, AR content is not a virtual marker unless it has a predetermined meaning to a downstream AR engine and triggers a predetermined response from that downstream AR engine. Also, real world content does not trigger such predetermined response.

The components of exemplary embodiments may comprise or consist of software, firmware, hardware, or any combination thereof. AR engines may comprise or consist of software, firmware, hardware, or any combination thereof. For instance, "AR engine" may refer to dedicated special-purpose software configured for producing AR content. The special-purpose software may be accompanied by special purpose hardware or firmware. The special-purpose software may be accompanied by general purpose hardware or firmware. The special-purpose software may be stored on a non-transitory computer readable medium (or media) accessible by one or more computers/processors and executable by the one or more computers/processors to perform specific methods/processes according to this disclosure. Multiple AR engines may operate independently of one another, though each may process or operate on some of the same or identical real world content. Some AR engines may be dependent on one another. A distributed network may support a plurality of AR engines which implement exemplary methods described herein.

According to an aspect of some embodiments, AR engines associate virtual content with real world content. The virtual content may be augmentations based on real world image data, a camera or device's location, a camera or device's pose (i.e., position and orientation), and/or other data collected from sensors which sense physical qualities of the real world. In some instances a camera is used to capture images or video at a considerable distance; in such circumstances a location employed by embodiments may be an estimated location nearer to the real world objects being photographed/videoed than is the physical camera. The augmented reality produced with the first virtual content may undergo subsequent image processing which processes both the real world content of the image or video frame(s) as well as the augmentations from the first virtual content. The first virtual content may be markers which may be readily identified by the image processing and trigger the selection of second virtual content usable for augmented reality representations. Augmentations selected and applied based on, for example, camera pose may trigger the addition of further augmentations to the base image or video frame of the real world. Standalone AR engines are able to work together by exemplary methods, each providing separate augmentations.

According to another aspect of some embodiments, real world content such as images or video frames undergo multistage processing. An end result of the multistage processing may be an augmented reality displayed to a human user. Different stages of the multistage processing may be performed by different AR engines. As between any two AR engines that process matching, corresponding, or identical real world content, the AR engine that processes the content earlier in time (an earlier stage of processing) may be regarded an upstream AR engine or upstream processor. The remaining AR engine, that which processes the content later in time (a later stage of processing) may be regarded as a downstream AR engine or downstream processor. Modifications made by an upstream AR engine "flow down" to the downstream AR engine along with real world content. A time delay may exist between stages of processing.

DETAILED DESCRIPTION

Figure 1:
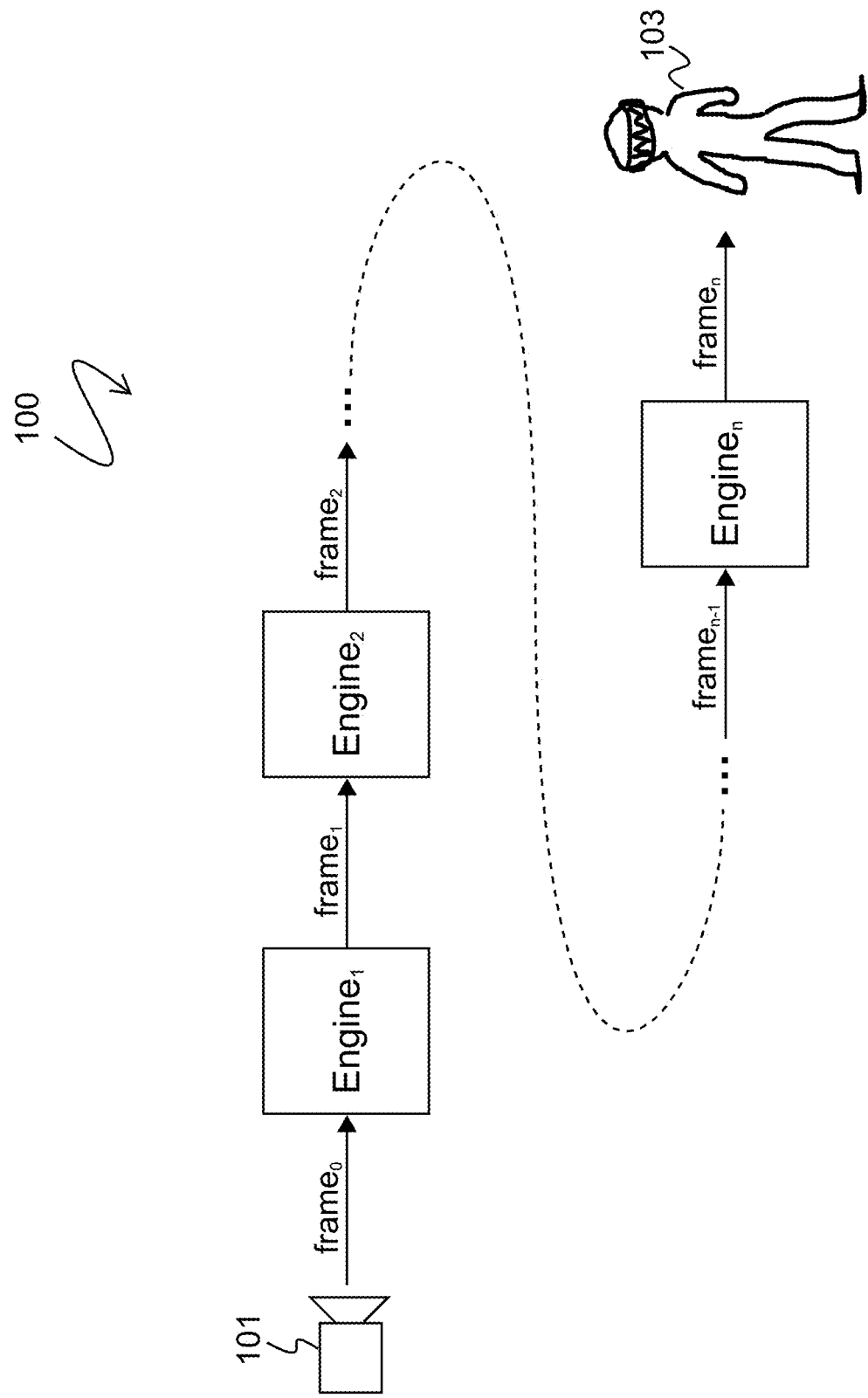
FIG. 1 is a block diagram of a system for multistage processing for producing an augmented reality output.

As used herein, "augmented reality", or "AR", is a direct or indirect experience of a physical, real-world environment in which one or more elements are augmented by computer-generated sensory output such as but not limited to sound, video, graphics, or haptic feedback. Augmented reality is frequently but not necessarily live/in substantially real time. It is related to a more general concept called "mediated reality", in which a view of reality is modified (e.g., diminished or augmented) by a computer. The general intent is to enhance one's natural perception of reality (e.g., as perceived by their senses without external devices). In contrast to mediated reality, "virtual reality" replaces the real world with a simulated one. Augmentation is conventionally in real-time and in semantic context with environmental elements. For example, many Americans are accustomed to augmented reality when watching American football on a television. A football game as captured by video cameras is a real world view. However, the broadcasting company frequently augments the recorded image of the real world view with the line of scrimmage and first down markers on the field. The line and markers do not exist in reality, but rather they are virtual augmentations that are added to the real world view. As another example, in televised Olympic races, moving virtual lines can be superimposed on tracks and swimming pools to represent the position of a runner or swimmer keeping pace with the world record in the event. Augmented reality that is not in in real-time can be, for example, superimposing the line of scrimmage over the image of a football match that is being displayed after the match has already taken place. Augmented reality permits otherwise imperceptible information about the environment and its objects to supplement (e.g., be overlaid on) a view or image of the real world.

Augmented reality differs from a heads-up display, or HUD. A HUD displays virtual objects overlaid onto a view of the real world, but the virtual objects are not associated visually with elements of that real world view. Instead, the HUD objects are associated with the physical device that is used to display the HUD, such as a reflective window or a smartphone. A HUD moves with the display and not with the real world view. As a result, the virtual objects of the HUD are not perceived as being integrated into the real world view. When a display pans left, for example, a HUD moves left with the display. In contrast, augmentations (of an augmented reality) would move right with the real world view. Embodiments of the invention are primarily concerned with augmented reality as opposed to HUDs, although HUDs may be used in conjunction with augmented reality.

For a concrete example distinguishing augmented reality from HUDs, consider again televised American football. A line of scrimmage is shown as an augmentation (augmented reality). The line appears in relation to the field and the players within the real world view. If a camera pans left to look at a coach on a sideline, the center of the field, the players, and the virtual scrimmage line all move off to the right hand side of the view where they will eventually exit the field of view if the camera pans sufficiently to the left. Scores of the competing teams are also usually displayed on televisions. In contrast to the line of scrimmage, the scores are typically superimposed on the view of the game in a top or bottom corner of the television screen. The scores always maintain a corner position in the television. When a camera pans left from the players in the center of the field to a coach on the sideline, the scores in essence move left along with the field of view, so that they maintain the exact same position on the display. The positions of the scores have no associative relationship to the positions of objects in the real world view. In this way, the scores behave like the virtual objects of a HUD as opposed to "augmentations" as generally used herein.

A camera includes at least one lens and an image sensor. The lens focuses light, aligns it, and produces a round area of light on an image sensor. Image sensors are typically rectangular in shape, with the result that the round area of light from the lens is cropped to a standard image format. A lens may be a zoom lens or a fixed focal length lens. As of 2017, most mobile multipurpose electronic devices have fixed focal length lens. However, embodiments of the invention may be suited for either type of lens. Lenses may be categorized according to the range of their focal length. Three standard classifications are wide angle, normal, and telephoto. Categorization depends on focal length (or focal length range) and lens speeds. Photographs or videos captured by a camera may be stored digitally, e.g., with pixel values stored on a computer readable medium. Additional sensors besides the optical elements may be used to collected additional information associated with the captured image(s) or video(s) such as but not limited to location (e.g., GPS coordinates), position, and orientation.

Augmented reality involves defining spatial relationships between virtual objects and real objects, and then making the virtual objects apparent to a user of the augmented reality system in such a way as to combine real and virtual objects. For example a visual augmented reality display could use virtual and real objects, and their defined spatial relationships, to generate a combined visual display in the form of a live streaming video (presenting real objects) overlaid with representations of the virtual objects. A spatial relationship between two objects (either or both of which may be virtual or real) may involve one or more of a topological relation, a distance relation, and a directional relation. A topological relation between an object A and an object B may be, for example, A is within B, A is touching B, A is crossing B, A is overlapping B, or A is adjacent to B. Precise spatial relationships between real and virtual objects allow an augmented reality system to generate perceptual experiences in which real and virtual objects are apparently combined seamlessly, e.g. for visual systems the combined presentation is apparently in the correct visual proportions, perspectives, and arrangement. Without correct reckoning of the spatial relationships in such a system, errors in the presentation of the system's output to the user can cause the system to be unusable, e.g. virtual objects appear out of place and therefore are not useful. An example is a virtual visual label that should label one building, but is erroneously shown overlaid onto a different building.

In order to create a visual augmented reality system, in addition to establishing spatial relationships between virtual objects and real objects, the visual perspective into the real world must be matched to the effective visual perspective into the virtual world. Even when the virtual world objects are sized and positioned correctly with respect to their real world counterparts, the determination of which virtual objects are eligible for visual presentation to the user depends on the perspective in the virtual world, which must be matched to the real world perspective of a real world camera in order to take advantage of carefully determined spatial relationships among virtual and real objects. The perspective of the camera includes the position of the camera, the orientation of the camera, and its field of view. One or more of these variables may be used to align a real world view with a virtual world view.

The need for a correctly matched perspective between virtual and real worlds means that in order to provide an accurate spatial relationship between virtual objects and real objects in an augmented reality output, it is necessary to determine aspects of the camera's surroundings. In many known AR systems, a camera's surroundings are determined using image processing, including object or feature recognition. Objects or features of a real world image are extracted and matched to reference databases containing data that describes known object or features. A convolutional neural network is an exemplary means for performing image processing and identifying objects or features in the image.

A camera's context and surroundings are also dependent on such variables as the camera's location, the camera's orientation, the camera's pose (i.e., the position and orientation together), and the camera's field of view. In some known AR system, some or all of these variables are ignored entirely, the known systems relying predominantly or entirely on image processing like object recognition algorithms.

Referring now to the drawings, FIG. 1 is a high level block diagram depicting an exemplary embodiment. The AR system 100 comprises a plurality of AR engines, each distinguished in FIG. 1 by subscript. Generally, a plurality of AR engines may comprise at least one upstream AR engine and at least one downstream AR engine. The AR system 100, as its name implies, is configured to produce an augmented reality (AR) or contribute to the production of AR which is ultimately supplied to one or more end users 103. At a front end of the system 100, an input is required in order for the system to acquire an "understanding" of whatever real world surroundings exist so that virtual content may be placed in semantic context with the real world. Semantic context may be environmental, e.g., concerning objects or landmarks in the vicinity of the AR view. Semantic context may be geographic, e.g., concerning the geographic location of the AR view. A suitable input is an image or frame (i.e., a video frame) from a camera 101. In general, a video comprising many video frames may be input to such a system. Other inputs and additional inputs are possible, but for the clarity of discussion the embodiment of FIG. 1 will use a frame.

$Frame_0$ is an output of the camera 101, and $frame_0$ is an input to $Engine_1$. $Frame_0$ is strictly real world content (i.e., it does not contain virtual content). The real world content may include image data. The real world content may include metadata like GPS coordinates, time of capture information (e.g., time stamps), perspective data (e.g., orientation, position, field of view), and/or other data describing real world objects, conditions, or circumstances. $Frame_0$ undergoes a series of modifications as it's processed by AR system 100. FIG. 1 shows stages of modifications to the original real world content of $frame_0$ by iterating the subscript number of the frame. Accordingly, $frame_1$ is a modified version of $frame_0$, $frame_2$ is a modified version of $frame_1$, and so on and so forth. The $n^{th}$ AR engine modifies $frame_{n-1}$ such that $frame_n$ is a modified version of $frame_{n-1}$. The variable "n" may be any whole number. The number of AR engines involved in transforming the initial real world content, $frame_0$, to a final AR output, $frame_n$, may be as few as two and as many as may be desired or necessary according to a given embodiment (2-10, 10-50, 50-100, 100-500, or more).

A central feature of AR system 100 is the nature of the modifications performed by the respective AR engines (i.e., $Engine_1$, $Engine_2$, ..., $Engine_n$). In general, a frame may be modified by an AR engine to contain one or more virtual markers (among other possible modifications). Assume for purpose of illustration $Engine_1$ adds a virtual marker M1 to $frame_0$. One or more downstream engines, say $Engine_n$, is configured or configurable to search for and detect marker M1 should marker M1 appear in the input frame, $frame_{n-1}$. In response to detecting the marker M1, $Engine_n$ performs a predetermined modification to the frame containing marker M1. The downstream AR engine (in this example, $Engine_n$) has a preexisting association between/among the virtual marker (or markers, as the case may be) and one or more augmentations. Stated simply, if <particular virtual marker detected> then <perform predetermined response (e.g., add specific augmentation) pre-associated with the particular virtual marker>. The predetermined modification by the downstream AR engine may take one or more of multiple forms. The modification may include the selection and addition of specific pre-determined AR content. The AR content may be one or more of visual, audial, and tactile. The modification may include the selection and addition of a virtual marker M2 or multiple additional virtual markers. In the latter case, the virtual marker M2 has the capability of triggering some further downstream AR engine to perform some other modification.

Figure 2:
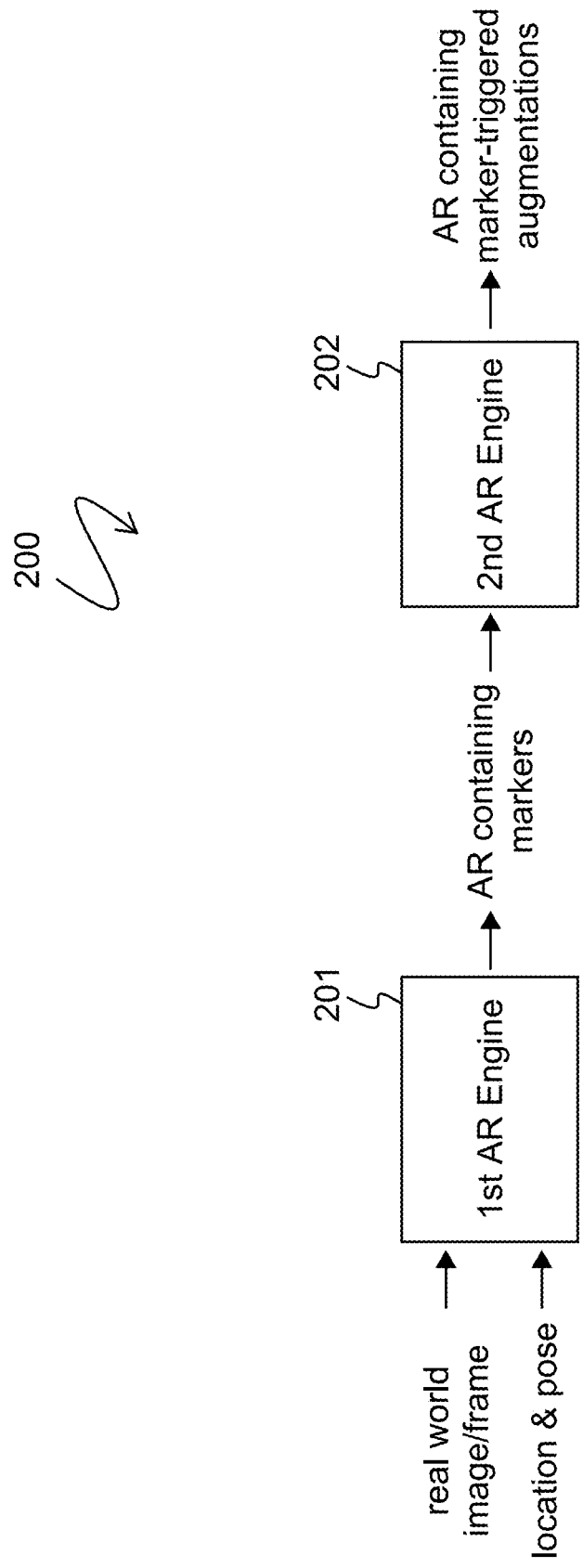
FIG. 2 is a block diagram of AR engine connectivity and data flow implemented in accordance with an exemplary process.

FIG. 2 shows another exemplary embodiment bearing similarities to that which was depicted by FIG. 1. For simplicity of discussion, FIG. 2 involves only two AR engines, labeled respective as 201 and 202. In FIG. 2, a system 200 is shown which comprises at least two AR engines: a first AR engine 201 and a second AR engine 202. System 200 illustrates a general data flow through which real world images/frames are processed to ultimately yield an augmented reality output intended for human consumption. As made clear by the arrows which show a direction of information flow within the system 200, the first AR engine 201 is characterizable as an upstream AR engine. The second AR engine 202 is characterizable as a downstream AR engine. Both engines 201 and 202 are configured to generate augmented reality. More particularly, both receive image/frame content that includes real world image data and are configured to add various augmentations (i.e., representations of virtual objects) to that real world image/frame. However, engine 201 and engine 202 differ in their primary approaches to performing augmentation of the images/frames that are input to each respective engine. **As illustrated in FIG. 2, engine 201 takes as an input images or video frames containing real world image data. In addition, engine 201 takes as further input the location and pose of the camera (or cameras) that captured the real world image data. Based on the camera's location and pose (i.e., position and orientation), the engine 201 associates selected virtual content with the real world content of the input images/frames. The virtual content supplied by engine 201 is image or video data which may, for example, be superimposed over the base images/frames or otherwise incorporated therewith. The combination of the virtual content from engine 201 and the original real world content is such that, if delivered to a display device (e.g., a monitor, television, mobile screen, etc.), the virtual content and the real world content display concurrently. Some or all of the virtual content supplied by engine 201 may be characterized as "virtual markers".

"Virtual markers", as used in the context of some exemplary embodiments, refers to AR augmentations with certain notable characteristics. First, as discussed in the preceding paragraph, virtual markers may be added in dependency of a camera's location and pose. The virtual markers may be placed without any actual image processing such as by a convolutional neural network. Furthermore, virtual markers may differ from ordinary augmentations in that they may have both an apparent visual appearance as well as a hidden meaning. Virtual markers may be treated as augmentations that are visual "keys" which may "open" or "trigger" additional AR content when detected by an AR engine. A virtual marker may pair or link to at least one reference source (e.g., a lookup table) which stores a hidden meaning of each respective virtual marker. Virtual markers may be configured to "blend" with real world content of neighboring pixels such that they are imperceptible or difficult to perceive by the unaided human eye. However, from the perspective of an AR engine, virtual markers are configured to be recognizable and differentiable from real world content. As a loose analogy, a virtual marker may be likened to a watermark on paper. Technically speaking, both a virtual marker and a paper watermark are "visible," yet both may not be readily perceived by the untrained and unassisted human eye.

Returning to the specifics of FIG. 2, the output of the first AR engine 201 is an augmented reality containing virtual markers which have been applied to the real world content of the image(s)/frame(s). This output of engine 201 serves as the input to AR engine 202. The second AR engine 202, in contrast to the first AR engine 201, may be especially configured for image processing such as by a convolutional neural network. When processing the input images/frames, both real world content and the first virtual content added by engine 201 may be processed together. The virtual markers are such that they have particular predefined meaning to the engine 202. In some embodiments, the virtual markers may be faster and easier to image process than the real world content surrounding the virtual markers. For example, the second AR engine may have access to the reference sources discussed above and be able to quickly look up discovered virtual markers using the reference sources. The second AR engine 202 proceeds to add its own augmentations (i.e., representations of virtual objects). Of the augmentations added by engine 202, some or all of the augmentations are selected because of the detection of one or more virtual markers. That is to say, the second AR engine selects virtual content to include in an AR output by processing images or video frames containing both the virtual content of the first AR engine (e.g., the virtual markers) and the real world content (i.e., as originally generated by a camera). The output of engine 202 is therefore an augmented reality which includes marker-triggered augmentations, among possible other augmentations. The AR output may be contained in a signal which is processable by an end user device to present the AR output to the user of that device.

Figure 3:
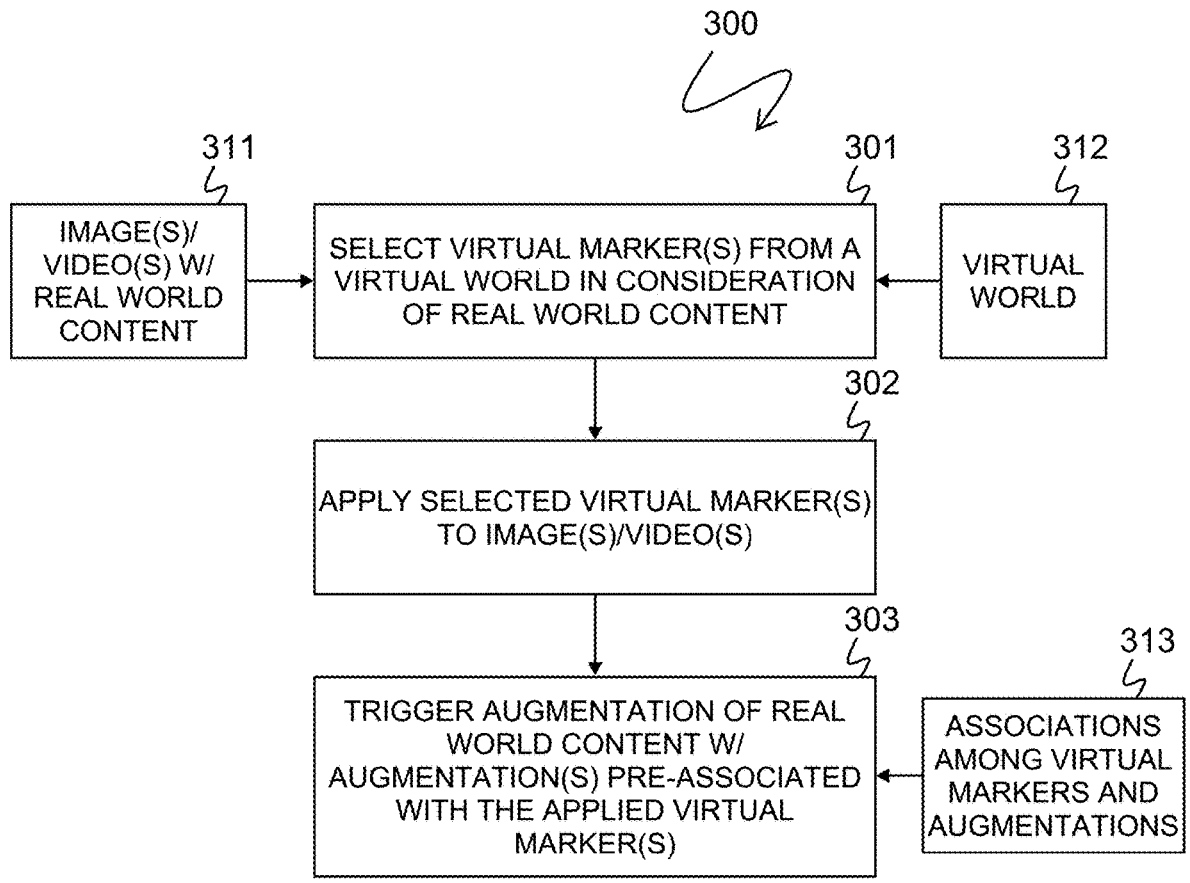
FIG. 3 is an exemplary method for producing or contributing to the production of an augmented reality.

FIG. 3 shows a further exemplary method 300 for producing (or contributing to the production of) an augmented reality (AR). At block 301, an upstream AR engine selects one or more virtual markers from a virtual world 312. The virtual markers are selected in such a way as to be in semantic context with the real world content of the image or video to be augmented. Semantic context may be achieved by matching perspective information of the real world content with perspective information in the virtual world. In particular, location, pose, and/or field of view may be used. The location is a location associated with the real world objects depicted by the real world content. This may be an actual location of the real world objects or the location of the viewer, which is typically the location of a camera that captured the original image or video. A detailed exemplary subprocess for selection of virtual markers is described below in connection with FIG. 4.

After one or more virtual markers have been selected, the select marker (or markers) are applied to the image or video (block 302). Application of the virtual markers generally comprises modifying the real world content. Modifying the real world content may consist of modifying particular pixel values. For example, a specific pattern of points or pixels may be changed to specific values to create a subtle but detectable silhouette or embedded code within the real world content. After the selected virtual marker (or markers) is applied, the resulting image or video data may be output from the AR engine. Prior to output, the AR engine may perform additional processing, such as the addition of other augmentations besides virtual markers. Alternatively, the AR engine may not perform any additional processing which is unrelated to selection and application of the virtual markers (that is, blocks 301 and 302 of FIG. 3).

At a downstream AR engine the output image or video of the upstream AR engine is treated as an input. There the one or more applied markers in the image or video trigger the downstream AR engine to augment the real world content of the image or video with one or more augmentations (block 303). The downstream AR engine uses associations 313 among virtual markers and augmentations. These associations may exist prior to the detection of any applied markers by the downstream AR engine. The upstream AR engine (that which performs steps 301 and 302) may have no knowledge or awareness of what associations or reactions a downstream AR engine will have once triggered by the virtual markers applied by the upstream AR engine. Indeed, the upstream AR engine need not necessarily have knowledge that at least one of the augmentations it applies to the image or video 311 containing real world content is in fact a virtual marker.

Figure 4:
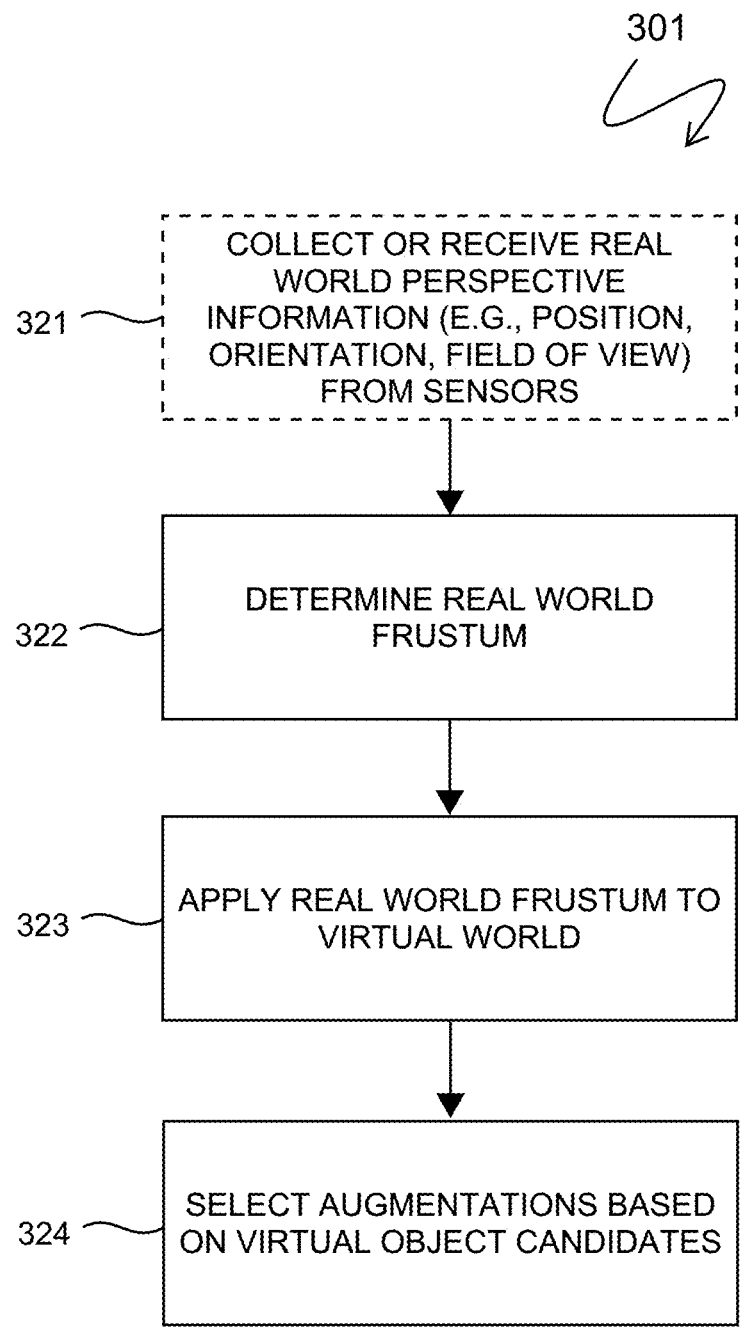
FIG. 4 is an exemplary sub-process for selecting virtual markers.

FIG. 4 shows exemplary sub-steps to block 301 of FIG. 3. Perspective information characterizing the real world content of the image or video to be augmented may be collected or simply received at block 321. Generally, a GPS sensor, digital compass, and gyroscopic sensors, for example, may be used to collect the 3D position and orientation of a camera co-located with such sensors. At block 322, a 3D real world frustum is determined based on the 3D position and orientation of the camera, and on assumptions about the near and far field limits. At block 323, the real world frustum is applied to the virtual world and thus determines which virtual objects are candidates for augmentation into the original camera images. Virtual objects which are in the viewing frustum may be viable candidates, whereas virtual objects outside the viewing frustum may not. At block 324, selection is made of augmentations based on the virtual object candidates. Augmentations are the actual virtual content added to real world content and which may be consumed by a user viewing the AR output. The selection at block 324 may involve one or more criteria including, for example, user option selections and the relationships between different virtual objects. For instance, the processors may determine which of the virtual objects obscure parts of each other based on the frustum in the virtual world. The final augmentations may then be applied to the image or frame containing real world content at block 302 of FIG. 3. The process 301 according to some embodiments may involve little or no image processing whatsoever. In some cases image processing may also be used, however.

The virtual world 312 may be a 3D virtual representation of the real world which may be stored as data in one or more databases (e.g., a central database or a distributed network). Such databases or networks may store, for example, geometric aspects of the virtual representations and characteristics of the objects which are instantiated within that virtual representation.

In some embodiments, one or more processors (e.g., of the device or system that includes the initial camera, or of an AR engine) are configured to use some combination of some or all of the following to determine which virtual objects should be provided (e.g., shown or otherwise output) as augmentations: digital compass input from a magnetic sensor; rotational data from a gyroscopic sensor; acceleration data from linear acceleration sensors; GPS data (latitude, longitude, altitude, and geodetic datum) from a GPS sensor; or image data from a video stream (which may itself include augmentations from other AR systems). The processing of this information is used to determine the real world viewing device's (e.g., camera's) position, orientation, and field of view (expressed as a frustum), and to estimate an accuracy of that determination. For example, the one or more processors may determine a viewing device's (e.g., camera's) six-dimensional location. Location may be the set of latitude, longitude, altitude, geodetic datum, and orientation, or include some combination of these. Orientation may be determined as a combination of angles, such as a horizontal angle and a vertical angle. Alternatively, orientation may be determined according to rotations, such as pitch, roll, and yaw. Based on the real world viewing device's (e.g., camera's) frustum, and on the detected placement of any relevant image data in the image, augmentations may be displayed as sourced from the 3D virtual representation (a virtual world), as modified by characteristics associated with that representation, and potentially adjusted due to detected image data.

For example, GPS data along with digital compass and gyroscopic sensor data may be used at a given moment to determine the 3D location and orientation of a camera that is co-located with the relevant sensors. The resulting real world frustum might then be applied to a 3D virtual representation (a virtual world). Corrective algorithms may be used during or after the applying step 302. For instance, if a putative augmentation is not be exactly positioned on or adjacent to an object which appears in the real world content, a procedure may be provided which "snaps" the augmentation to the nearest object detected in the image.

The one or more processors involved with the subprocess illustrated by FIG. 4 conduct processing that determine which augmentations should be added to a specific real world view, and as a corollary what augmentations should not be added to that view. There are multiple aspects of a real world view that affect such a determination. A first aspect is the relationship between the viewing device (e.g., a camera) and an "object" of interest.

In embodiments of the invention, processing steps such as those in FIG. 4 may be configured as a greater or fewer number of steps compared to those which are shown and organized with further substeps.

Image processing is conducted is some exemplary embodiments using a convolutional neural network. A convolutional neural network comprises computer-implemented neurons that have learnable weights and biases. A convolutional neural network employs a plurality of layers and combines information from across an image to detect an object in the image. Various image recognition techniques may be employed, some of which employ a convolutional neural network. Examples are targeting, windowing, and classification with a decision tree of classifiers.

Referring to FIG. 3, and particularly block 303, an augmentation that is triggered may involve one or more (i.e., at least one) sensory modality. Sensory modalities may be visual, audial, tactile or haptic (e.g. vibration), or olfactory, or any combination thereof, e.g., audiovisual. Augmentations may be take the form of 3D representations of real objects (e.g. a detailed 3D representation of a cell tower), or of abstractions of real objects (e.g. a cell tower represented as a simple cylinder with a sphere at the top), or of indicators or cues (e.g., callout boxes such as shown in FIG. 5E and discussed below). Some information represented in an augmentation may have no corresponding real world shape. For example, a wireless network link between two wireless network antennas has no real world visible representation, so any augmented presentation of that connection is necessarily some kind of abstraction (e.g., a geometric shape). On the other hand some information represented in an augmentation may have at least one straightforward augmentation that is minimally abstract, e.g., a 3D graphic of a building that is positioned, shaped and colored to be very much like a corresponding real building.

Virtual objects of virtual markers selected at block 301 may be stored and manipulated as data within one or more databases. The virtual objects have their own existence separate from how they are displayed, visualized, haptically buzzed, or otherwise output by an output device. So, generally speaking, a virtual object has its own characteristics, and then, based on those characteristics and on the real and the virtual environment, an exemplary augmented reality system determines what is presented to the user. If a given virtual object is obscured, then it may not be presented to the user as an augmentation. On the other hand, if the system determines that a given virtual object should be visible to the user given the viewing device's position and orientation in the real world and therefore its position and orientation in the virtual world, an augmentation may be displayed (or otherwise provided).

An augmentation may correspond with a virtual object that has a specific location in a virtual world. The virtual world is characterized by a number of locations which correspond with real locations which appear in an image or frame of the real world. In essence, a virtual world (e.g., a virtual model of the real world) is populated with virtual objects corresponding with either or both seen real world objects and unseen qualities of network performance and assets. A virtual world view is characterizable with a frustum. A frustum includes position, orientation, filed of view, and near and far limits of the field of view. A real world view is similarly characterizable, except that in a real world view there is technically no hard limit on near and far limits of field of view.

As a concrete example, an image of a real world view (i.e., a real world image) may include within its field of view a building with a typical rectangular shape. The building has a particular GPS location. More specifically, each of the four corners of the building that touch the ground has their own GPS coordinates. In a corresponding virtual world, a virtual object in the form of a rectangular prism exists at coordinates which align with the real world GPS coordinates. The virtual object (in this case the rectangular prism) if displayed in an augmented reality would align with the real building in any augmented view so that the two objects—the real world object and the virtual object, align, one superimposed on the other.

Some augmentations are or include a solid 3D model rendered within the context of the real world image. As alluded to above, some augmentations are subject to be changed or replaced or substituted entirely over time. Some augmentations are animations superimposed on the real world image. For example, an augmentation may be a scaled 3D model or animation that is played based on some event. Animations may be triggered (e.g., macroed) based on such an event.

In some embodiments, the triggered augmentation(s) at block 303 is based on (e.g., dependent on) the user and differs from one user or individual to the next. Different viewers or users may be provided unique augmentations and thus unique or at least different augmented reality experiences. As an example, a difference can be varying levels of detail (e.g., more details or fewer details) offered to a first user as compared to that which is offered to a second user.

FIGS. 5A to 5E show a sequence of images or video frames relating to one initial image/frame from a camera that is subjected to augmentations according to different stages of exemplary methods which will now be described.

Figure 5A:
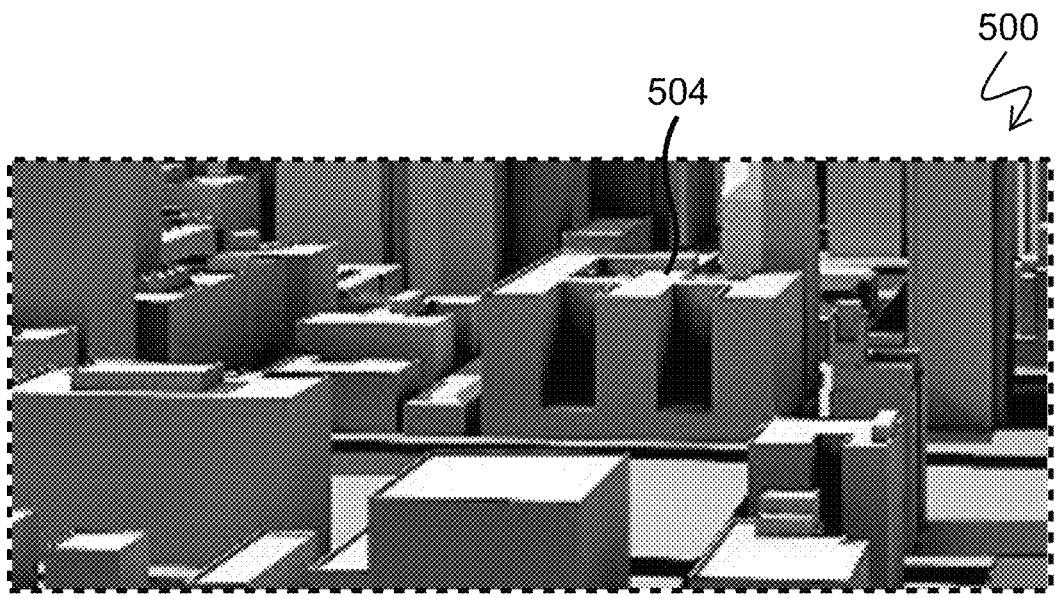
FIGS. 5A to 5E are frames involved in an exemplary process producing AR.

FIG. 5A shows a video frame 500 from a camera feed prior to any augmentation. The frame 500 shows only reality at this stage. No augmentations or representations of virtual objects have been added. The frame 500 shows matter which would be visible to the unaided human user. The frame 500 may be representative of the output of a camera and the input to an AR engine. In this particular example, the frame 500 includes a real world building 504.

Figure 5B:
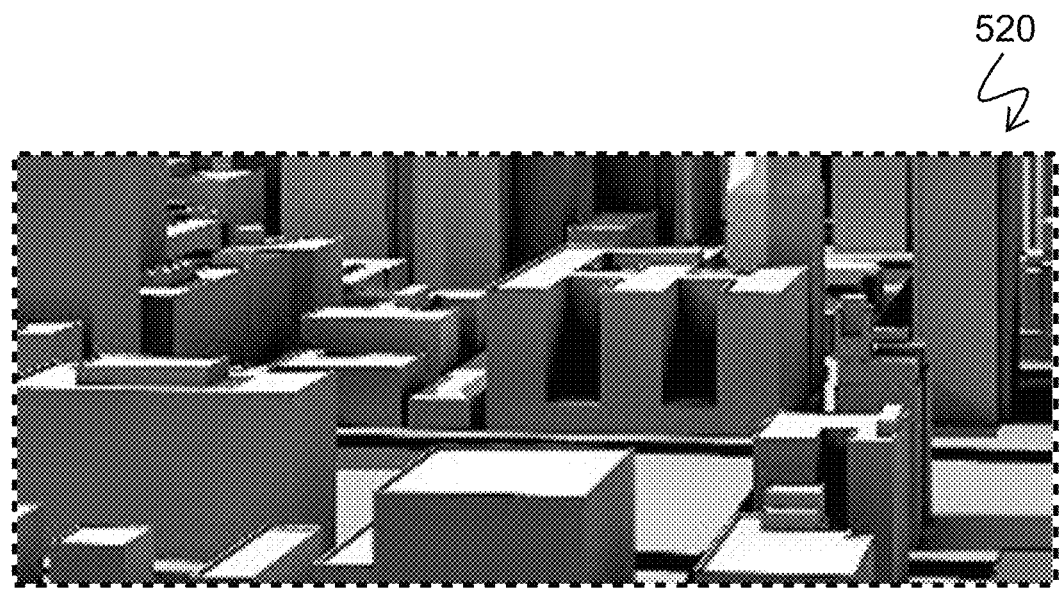

FIG. 5B shows a frame 520 of a virtual world. The virtual world is a 3D model modeled after the real world, and the frame 520 is aligned in various respects (e.g., location, field of view, viewing frustum, etc.) with the real world view of the frame 500 in FIG. 5A. Virtual models such as this which are modeled after the real world are one exemplary approach to storing geo-coded data used to create augmentations in augmented reality. As a brief and simple use example, an AR engine may be required to generate an augmented reality for a user who has visibility of GPS coordinates 40.6892° N, 74.0445° W. Data usable to produce an augmentation may be stored in the virtual model at virtual coordinates corresponding with real world coordinates 40.6892° N, 74.0445° W. When the AR engine detects that the user has visibility of these coordinates in the real world, it accesses the data geocoded with the matching coordinates in the virtual model. The engine then takes the virtual content and uses it to generate an augmentation superimposed on or otherwise incorporated with a user's real world view at coordinates 40.6892° N, 74.0445° W.

Figure 5C:
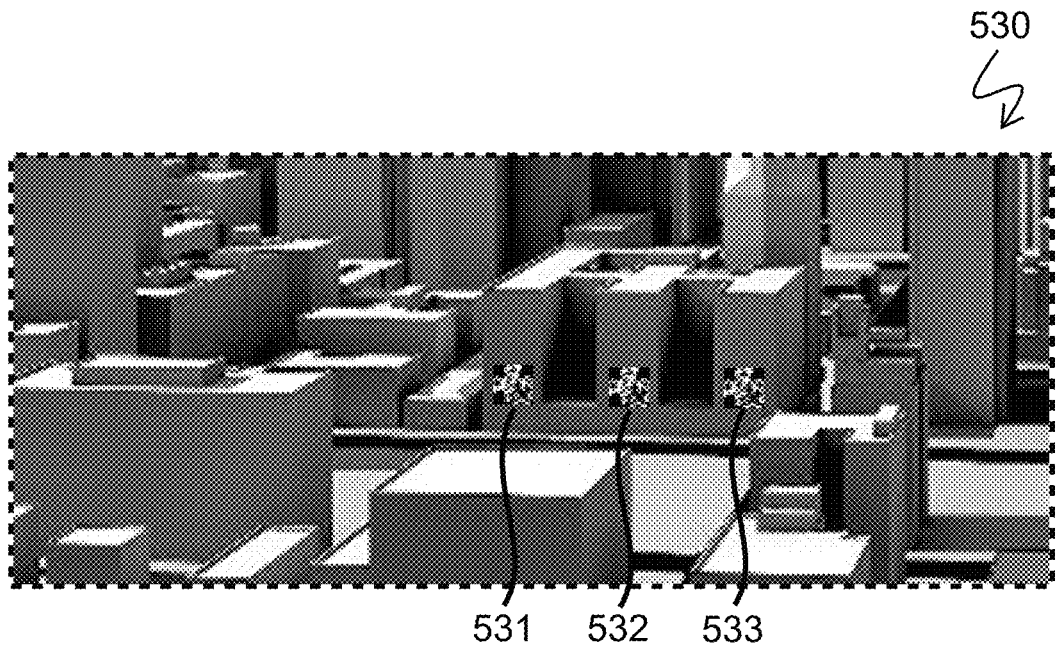

FIG. 5C shows the same virtual model as shown in FIG. 5B. FIG. 5C shows a frame 530 which matches frame 520 except for the fact that virtual markers 531, 532, and 533 have been added to the virtual model. Note that the lead lines and three digit numbers are traditional patent figure labeling used for identifying parts of a figure; they are not part of the frame 530. The virtual markers may be, for example, a visual cue having a predefined significance. The predefined significance is known to one or more AR engines. For example, the predefined significance may be stored in one or more reference databases used by an AR engine. The markers are virtual content and accordingly are not visible to the unaided human eye in the real world. Thus, the virtual markers 531, 532, and 533 are absent from the base real world image in the frame 500 of FIG. 5A. In the figures, the virtual markers 531, 532, and 533 are relatively large quick-read (QR) codes. This is but one example of virtual markers, and virtual markers may take a variety of other forms.

Figure 5D:
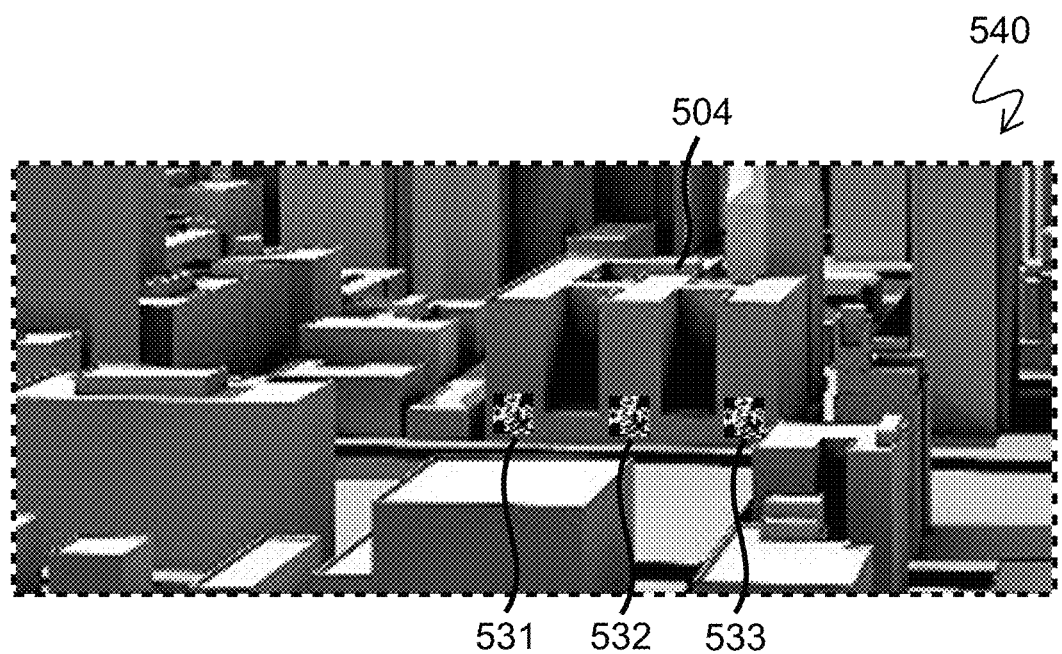
Figure 5E:
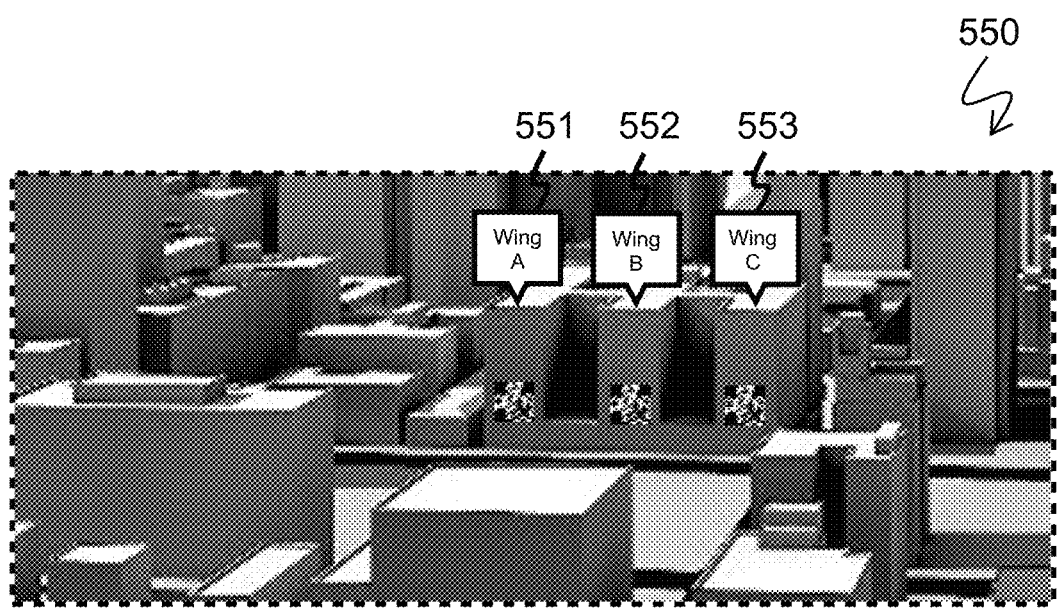

FIG. 5D shows an augmented reality frame 540 comprising the real world contents of video frame 500 from FIG. 5A augmented with virtual markers 531, 532, and 533 from the virtual model. The markers 531, 532, and 533 are respectively superimposed over three different walls of a building 504. The frame 540 may be the output of a first AR engine (an "upstream" AR engine) and also the input to a subsequent AR engine (a "downstream" AR engine). In this illustrative example, the virtual markers have the same appearance when stored in the virtual world (frame 530) as they do in a state-of-use augmenting a real world image or frame (frame 540). However, this need not be the case in all scenarios and embodiments. When stored, a virtual marker may be a virtual object the appearance of which within the virtual world may vary. In some cases the appearance of the virtual marker when stored may be of little or no consequence. When in a state-of-use (i.e., applied to real world content), a virtual marker may be an augmentation corresponding to the virtual object but which has a different appearance than the virtual object.

FIG. 5E shows an augmented reality frame 550 consisting of the AR frame 540 from FIG. 5D further augmented with augmentations 551, 552, and 553, all of which are callout boxes in this particular example. The augmentations 551, 552, and 553 were selected as augmentations based on the markers 531, 532, and 533. In other words, when the frame 540 from FIG. 5D was image processed (e.g., for object recognition) the markers were identified by the image processing algorithms and triggered the selection of the callout augmentations. In this particular example, each callout identifies a respective wing of a real world building 504 visible to the user. In this instance, the callout augmentations were not selected based on the image processing algorithms identifying the building or parts of the building. Rather, it was the virtual markers that triggered the addition of the further augmentations (the callouts). In different embodiments, the second/subsequent "round" of augmentation involving image processing may select and produce augmentations solely based on detected markers or, as an alternative, on a combined basis of detecting markers as well as detecting features or objects in the real world content of the input video feed or images.

Any number of AR engines may be involved in processing a real world image or frame before the corresponding augmented reality content is supplied to a user. The example illustrated by FIGS. 5A-5E involves a minimum of two AR engines. A first AR engine takes the real world frame of FIG. 5A as input and yields the augmented frame of FIG. 5D as an output. A second AR engine takes the augmented frame of FIG. 5D as input and yields the further augmented frame of FIG. 5E as an output. One or more additional downstream AR engines may take the frame of FIG. 5E (or a derivative thereof) as input and generate yet a different output. In this manner any number (two, three, four, five, tens, hundreds, etc.) of AR engines may be involved in augmenting the same or similar base real world content.

Figure 6:
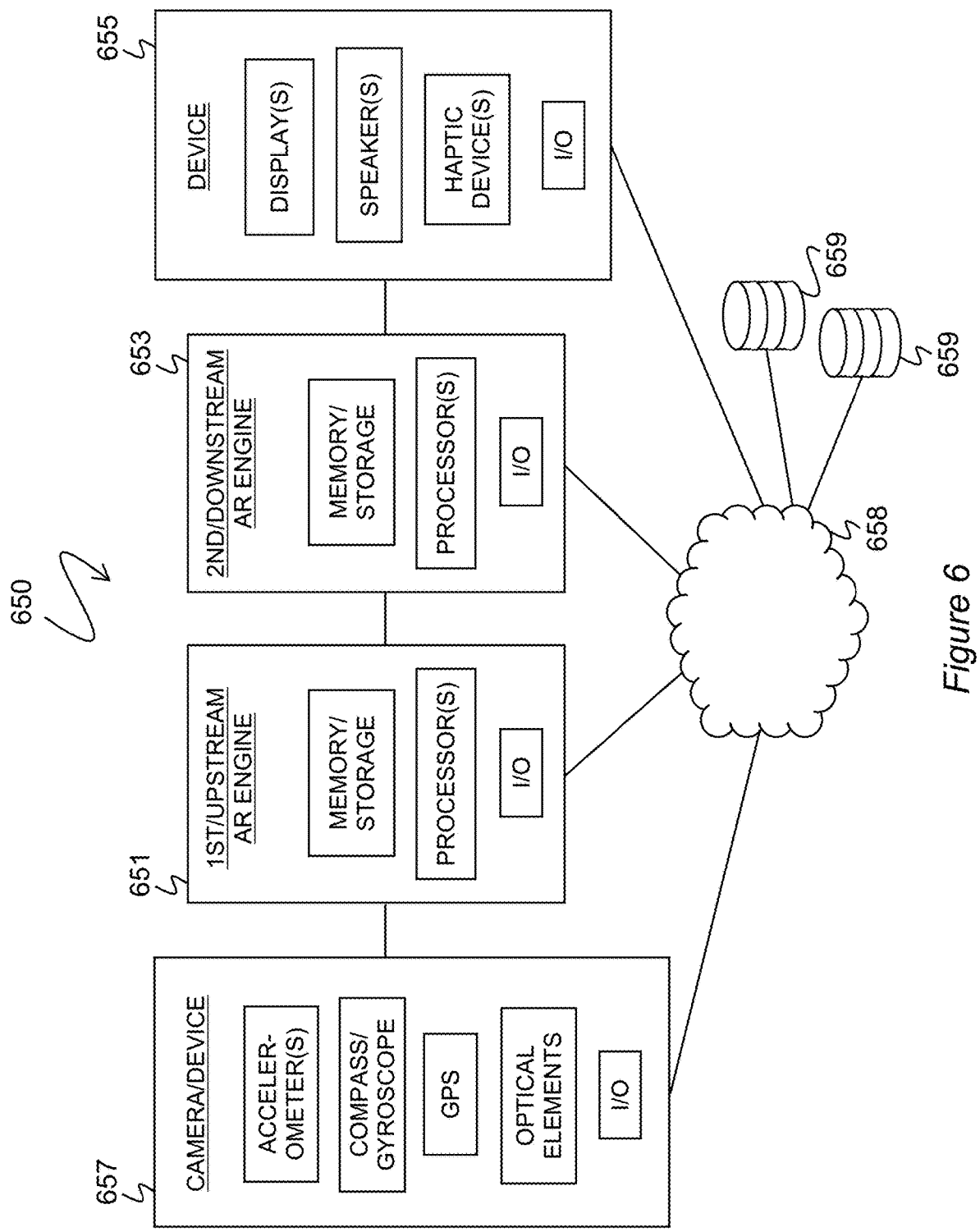
FIG. 6 is a block diagram of a system for providing AR according to some exemplary embodiments.

FIG. 6 is a block diagram of a system 650 for producing an augmented reality (AR). The system 650 comprises a plurality of AR engines (651, 653), one or more output devices 655, and one or more cameras 657 (which may be part of some multifunction device having capabilities besides photography/videography). AR Engines 651, 653, etc. are apparatuses configured to provide or produce or contribute to the production of augmented reality content. An exemplary AR engine takes as input a still image or still images, or a video or video frames, and outputs augmented reality content. AR Engines may take a variety of forms with varying amounts of hardware versus software. Some commercial examples of AR engines embodied as AR headsets are Microsoft HoloLens, Sony SmartEyeglass, Google Glass, and Vuzix M100 Smart Glasses. Some AR engines may be embodied as virtual reality (VR) headsets. Commercially available examples include Oculus Rift, HTC Vive, and Sony PlayStation VR (Project Morpheus). In the case of VR headsets, AR may be produced by displaying a real world camera's feed to a user as the base image. AR engines may be embodied simply in software. For instance, the software which supports Microsoft HoloLens may be characterized as an AR engine, independent of the physical headset a user must wear to experience the output of the AR engine. Electronic devices like smartphones, personal computers, and servers (both general purpose as well as special purpose) may also be configured as AR engines.

In some embodiments, an exemplary input device 657 comprises, at a minimum, means for capturing information about real world surroundings. Generally the means for capturing information is an optical device, more specifically a camera. The type and number of cameras may vary among embodiments, including visible-light sensitive cameras and night vision (infrared) cameras, among others. Other data besides visual data may be collected to describe real world surroundings. For instance, embodiments may comprise additional sensors such as but not limited to any combination of the some or all of the following: accelerometer(s), location sensor(s) (e.g., GPS modules), gyroscope(s), magnetic field sensor(s) or magnetometer(s), proximity sensor(s), barometer(s), thermometer(s), and microphone(s). The sensors collect the type of data of their respective types (e.g., magnetometer collects magnetic field data or compass data, microphone collects audio data, etc.).

Associations among virtual markers and the responses they trigger (e.g., the augmentations they cause to be applied to real world content) may be stored in individual AR engines 651, 653, etc. and/or in remote databases 659 and/or according to a distributed network of storage resources (e.g., peer-to-peer systems).

FIG. 6 shows physical interconnections as well as connections over a network 658 such as the Internet. Individual embodiments may involve hardware connections, networked connections, or some combination thereof. While FIG. 6 shows system 650 implemented according to several interconnected hardware components, the precise hardware configuration may vary among embodiments. For instance, the camera 657, first AR engine 651, second AR engine 653, $n^{th}$ AR engine, and output device(s) 655 may all be comprised by one unitary device. One or more AR engines may be implemented as software, in which case the functionalities described herein with respect to the AR engines may be configured as instructions on a computer-readable medium that, when executed by one or more processors, cause the processors to perform one or more of the methods in accordance with what is described herein and illustrated in the figures.

Figure 7:
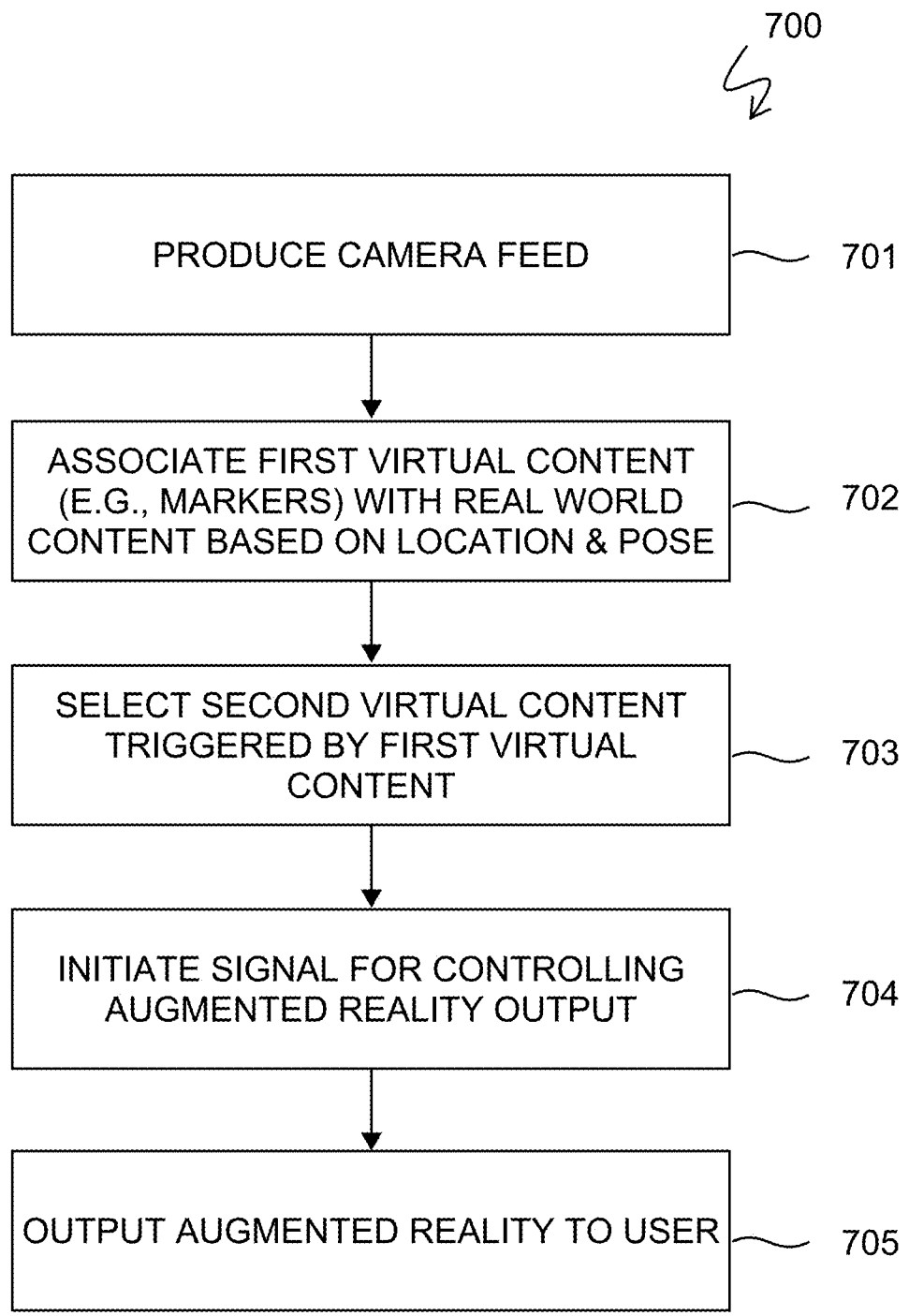
FIG. 7 is an exemplary method of providing augmented reality.

FIG. 7 is a flowchart 700 of another exemplary method for producing an augmented reality. A camera feed (e.g., images or video frames) is produced by a camera at block 701. The camera may be any device configured for capturing images or videos of the real world.

The real world content produced by the camera is received by a first AR engine. It should be appreciated that the adjective "first" does not necessarily preclude other engines preceding the "first AR engine" in the data flow pathway. The adjective "first" serves to distinguish the "first AR engine" from another AR engine, which is conveniently referred to as "second". Other engines may be arranged between the first and second AR engines. However, it is the case that the second AR engine is downstream of the first AR engine with respect to data flow. In other words, content output by the first AR engine is ultimately received and used as an input by the second AR engine. Other engines may also follow after the second AR engine.

At block 702, the first AR engine associates first virtual content (e.g., markers, etc.) with real world content captured by the camera based on one or more of the camera's location, position, and orientation. Position and orientation may be referred to collectively as pose. In some exemplary embodiments, the first AR engine associates the virtual content with the real world content based on both the camera's location as well as the camera's pose. The first virtual content and the real world content are both image or video content configured for concurrent display. At least some of the first virtual content includes one or more virtual markers. The manner of association may vary among embodiments. As one example, the associating step may comprise superimposing one or more markers over selected parts of the real world content. As another example, the associating step may comprise adding the first virtual content to specific locations within the real world content. The specific locations may be particular pixels, for instance, or particular groups of pixels. In exemplary embodiments, the first AR engine performs the association of the first virtual content and real world content without extracting objects or features from the real world content captured by the camera. In other words, the first AR engine performs association independent of image processing such as by a convolutional neural network. By avoiding such processing, the first AR engine advantageously avoids significant costs in power, processing, and time.

The output of the first AR engine—a reality comprising real world content from the camera augmented with one or more virtual markers—is received as input to a second AR engine. The second AR engine, in contrast to the first, is especially configured to perform image processing such as by a convolutional neural network to extract features or objects. The second AR engine may execute image processing algorithms which are specially configured to search for known virtual markers. In some cases, the second AR engine may selectively search for and recognize only virtual markers (as opposed to other content which is not a known virtual marker).

At block 703, the second AR engine is configured to select second virtual content after or while processing images or video frames containing both the first virtual content and the real world content. In exemplary embodiments, the computer-implemented decision to select for output at least some of the second virtual content is triggered by detection of one or more markers in the image(s) or video(s) being processed by the second AR engine. The second virtual content is usable for producing one or more AR augmentations. While markers are visual in nature, the second virtual content may be associated with augmentations which are any one or multiple of auditory, tactile (haptic), and auditory.

At block 704, a signal is initiated for controlling an augmented reality output by an output device. The signal may be initiated by the second AR engine or another device arranged in the data flow between the second AR engine and the output device.

At block 705, the output device actually outputs the augmented reality to a user, the output including the selected second virtual content and the real world content. Output to a user may involve one or more of display(s), speakers(s), and haptic element(s).

Advantages and applications of embodiments of the invention are multitudinous. Consider the following use scenario which illustrates an advantage of an exemplary embodiment. An AR device is configured to provide audio description of what a user can see. Audio output is an augmentation to a real world view. The device may be, for example, a head-mounted display (HMD). The device includes a camera which, when the HMD is in use, substantially at the same location as the user and aligned with the user's pose. If the user is riding a boat and moves from the starboard side to the port side, so does the camera. If the user looks up and over, so does the camera. The user may be, for example, taking a ferry tour of the San Francisco Bay and looking around at such sights as the coastline of San Francisco's business district, at one of the bridges, at Alcatraz Island, at a seal poking its head above the water, or one of many other possible sights visible from the ferry. A traditional AR device may constantly perform image processing of the camera feed to detect and identify the San Francisco skyline, for example, or the seal in the water. The image processing approach has disadvantages, however. For one, it is processing intensive and therefore requires extensive power consumption and expensive hardware. Another disadvantage is the possible failure to adequately recognize or identify the objects or features in the video feed. If the user gazes at the water and only water is visible in the camera feed, the traditional AR device may be unable to recognize that the water is in fact San Francisco bay water. If the user gazes at the seal and only the seal and surrounding water is visible, the traditional device AR device may be unable to recognize the seal as one of the Harbor seals of the bay as opposed to some other seal or a seal at some location other than San Francisco Bay. In contrast, an exemplary AR system according to the instant disclosure may first use the camera's location and pose to augment the video feed of the water or the video feed of the seal in the water with a virtual marker. Because the first AR engine relies on location and pose instead of the contents of the video feed, the first AR engine is unaffected by the dearth of recognizable visual content when the video frame shows just water or just a seal surrounded by water. The first AR engine then proceeds to add one or more virtual markers. These markers may be obvious to a human, such as the QR codes shown in FIG. 5D. Alternatively, the markers may be subtle to a human, such as a particular color pattern in a portion of the frame that all but blends with the surrounding real world content. Significantly, whether or not the virtual marker it recognizable to a human, the virtual marker is recognizable to the second AR engine. The second AR engine performs ordinary image processing. Despite the potential lack of recognizable real world content, the presence of the marker enables the second AR engine to select and output AR content for the user which is meaningful to what the user is actively looking at.

Some embodiments of the invention may comprise computer readable storage media that are tangible devices that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or schematic and block diagrams of methods, apparatus (systems), and computer program products according to embodiments of the invention. It will be understood that each block of the flowchart illustrations and/or block diagrams, and different combinations of blocks in the flowchart illustrations and/or block diagrams, may be implemented by or with the use of computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. "One or more processors" may refer in various embodiments to one or general purpose computers, special purpose computers, or some combination thereof. AR engines may be processors. Computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While the invention has been described herein in connection with exemplary embodiments and features, one skilled in the art will recognize that the invention is not limited by the disclosure and that various changes and modifications may be made without departing from the scope of the invention as defined by the appended claims.

What is claimed is:

1. A method for producing an augmented reality (AR) for an image or video containing real world content, comprising
    selecting one or more virtual markers from a virtual world based on a location associated with one or more real world objects depicted by the real world content;
    applying, with an upstream AR engine, the one or more selected virtual markers to the image or video, wherein the one or more selected virtual markers are AR augmentations; and
    triggering, by the one or more applied virtual markers, a downstream AR engine to augment the real world content of the image or video with one or more further augmentations, wherein the downstream AR engine has a preexisting association among the one or more further augmentations and the one or more applied virtual markers,
    wherein, from a perspective of the downstream AR engine, the one or more applied virtual markers are configured to be recognizable and differentiable from both the real world content and AR augmentations which are not virtual markers.

2. The method of claim 1, wherein the selection in the selecting step is further based on a pose of a camera used to capture the image or video, wherein pose consists of a position and an orientation.

3. The method of claim 1, wherein the applying step comprises modifying the real world content.

4. The method of claim 3, wherein modifying the real world content consists of modifying one or more pixels.

5. The method of claim 1, wherein the virtual world is a 3D virtual model that is modeled after a real world environment.

6. The method of claim 1, wherein the location is a location of the one or more real world objects or a location of a camera when the camera was used to capture the one or more real world objects depicting the real world content.

7. A system for augmented reality (AR), comprising
    one or more virtual markers stored in a virtual world that is modeled after a real world environment;
    at least one upstream AR engine configured to
        select one or more of the virtual markers from the virtual world based on a location associated with one or more real world objects depicted by real world content of an image or video;
        apply the one or more selected virtual markers to the image or video, wherein the one or more selected virtual markers are AR augmentations;
    wherein the one or more applied virtual markers are configured to trigger a downstream AR engine to augment the real world content of the image or video with one or more further augmentations, wherein the downstream AR engine has a preexisting association among the one or more further augmentations and the one or more applied virtual markers,
    wherein, from a perspective of the downstream AR engine, the one or more applied virtual markers are configured to be recognizable and differentiable from both the real world content and AR augmentations which are not virtual markers.

8. The system of claim 7, wherein the selection in the selecting step is further based on a pose of a camera used to capture the image or video, wherein pose consists of a position and an orientation.

9. The system of claim 7, wherein the applying step comprises modifying the real world content.

10. The system of claim 9, wherein modifying the real world content consists of modifying one or more pixels.

11. The system of claim 7, wherein the virtual world is a 3D virtual model that is modeled after the real world environment.

12. The system of claim 7, further comprising the downstream AR engine, the downstream AR engine being configured to recognize the one or more applied virtual markers and augment the real world content of the image or video with the one or more further augmentations triggered by the one or more applied markers.

13. A method for augmented reality (AR), comprising
    based on a camera's location and pose, associating first virtual content with real world content captured by the camera, the first virtual content and real world content both being image or video content configured for concurrent display, wherein the first virtual content is one or more virtual markers which are AR augmentations;
    selecting second virtual content by processing an image or video frame containing both the first virtual content and the real world content, wherein selection of at least some of the second virtual content is triggered by the presence of the first virtual content, the second virtual content being usable for producing one or more further AR augmentations; and
    initiating a signal for controlling an augmented reality output by an output device, the output including the selected second virtual content and the real world content,
    wherein the steps of associating, selecting, and initiating are performed by one or more AR engines,
    wherein, from a perspective of an AR engine performing the selecting step, the one or more virtual markers are configured to be recognizable and differentiable from the real world content and AR augmentations which are not virtual markers.

14. The method of claim 13, wherein the first virtual content is one or more markers.

15. The method of claim 14, wherein the associating step comprises superimposing the one or more markers over selected parts of the real world content.

16. The method of claim 13, wherein the associating step comprises adding the first virtual content to specific locations within the real world content.

17. The method of claim 16, wherein the specific locations are specific pixels or groups of pixels.

18. The method of claim 13, wherein the associating step is configured to associate the first virtual content with the real world content without extracting objects or features from the real world content captured by the camera.

19. The method of claim 18, wherein the associating step is configured to associate the first virtual content with the real world content based only on the camera's location and pose.

20. The method of claim 13, wherein the associating step is performed by a first AR engine and the selecting step is performed by a second AR engine.

* * * * *